Figure 1:
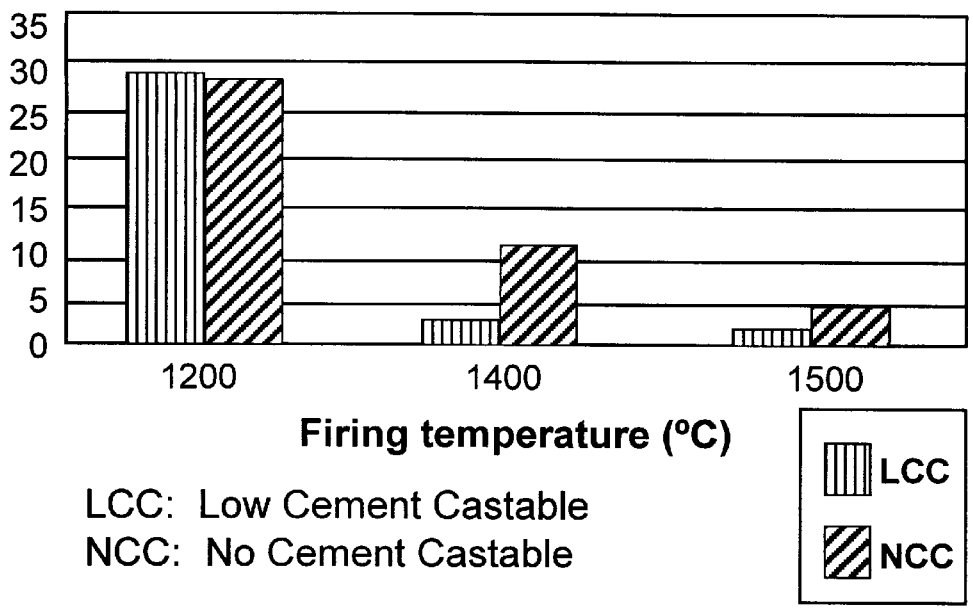

United States Patent

Azizian et al.

[11] Patent Number: 5,858,900
[45] Date of Patent: Jan. 12, 1999

[54] CASTABLE REFRACTORY SYSTEMS

[75] Inventors: Farid Azizian, Bicester; Kevin John Wills, Farnham Common, both of United Kingdom

[73] Assignee: Alcan International Limited, Montreal, Canada

[21] Appl. No.: 894,337

[22] PCT Filed: Feb. 16, 1996

[86] PCT No.: PCT/GB96/00362

§ 371 Date: Nov. 28, 1997

§ 102(e) Date: Nov. 28, 1997

[87] PCT Pub. No.: WO96/25371

PCT Pub. Date: Aug. 22, 1996

[30] Foreign Application Priority Data

Feb. 17, 1995 [GB] United Kingdom ............... 9503093

[51] Int. Cl.⁶ .................... C04B 35/66; C04B 35/63
[52] U.S. Cl. .................. 501/131; 501/127; 501/128; 501/129; 501/130; 501/153
[58] Field of Search .................... 501/127, 128, 501/129, 130, 131, 153; 106/692, 694, 696

[56] References Cited

U.S. PATENT DOCUMENTS

| | | | |
|---|---|---|---|
| 3,953,563 | 4/1976 | Kihlstedt et al. | 501/119 |
| 4,174,226 | 11/1979 | Fitzpatrick et al. | 106/64 |
| 4,327,185 | 4/1982 | Bonsall | 501/89 |
| 4,459,156 | 7/1984 | Henslee et al. | 501/153 |
| 4,495,301 | 1/1985 | Sutor | 501/127 |
| 4,834,798 | 5/1989 | Cisar et al. | 501/120 |
| 5,214,006 | 5/1993 | Langenohl | 501/89 |
| 5,744,412 | 4/1998 | Pearson et al. | 501/127 |

FOREIGN PATENT DOCUMENTS

| | | | |
|---|---|---|---|
| 0032602 | 7/1981 | European Pat. Off. | C04B 35/66 |
| 9117969 | 11/1991 | WIPO | C04B 35/66 |

*Primary Examiner*—Michael Marcheschi
*Attorney, Agent, or Firm*—Stoel Rives LLP

[57] ABSTRACT

A composition suitable for admixture with refractory grains to make a refractory monolithic formulation, consisting essentially of:

2 to 10 parts by weight of activated alumina;

0.25 to 1.0 parts by weight of an additive material which comprises at least one of an alumino-silicate-phosphate compound; a resin derived from an aldehyde and either an amine or an aromatic hydroxy compound; cellulose; polyethylene glycol(s); and methoxy polyethylene glycols;

0 to 50 parts by weight of fine alumina;

0 to 10 parts by weight of fine silica;

0 to 1 parts by weight of a dispersant; and 0 to 1 part by weight calcium aluminate cement.

20 Claims, 1 Drawing Sheet

LCC: Low Cement Castable
NCC: No Cement Castable

CASTABLE REFRACTORY SYSTEMS

The present invention relates to refractory monolithic formulations comprising activated alumina and little or substantially no calcium aluminate cement.

Monolithic refractories have been used for many years in the steel industry and elsewhere. Generally they are produced using a blend of coarse refractory aggregate such as fused alumina, tabular alumina or calcined bauxite grains of graded size, a fine alumina, and a relatively small proportion of calcium aluminate cement. A fine silica is also commonly present in the blend, and this will react to form mullite, which can provide fired strength.

The blend is mixed with water to form a concrete-like slurry, cast in shape and/or position and allowed to cure and dry. Subsequently the refractory is fired.

Calcium aluminate cement provides sufficient green strength after curing (green strength) and after drying (dried strength) for the refractory to survive before the firing process.

To avoid the development of excess porosity during drying and firing, and to develop maximum density, the very minimum of water should be employed, and this can be achieved by careful size grading of the coarse refractory aggregate grains and other components so as to optimise particle packing. Ideally only enough water should be added for stoichiometric hydration of the calcium aluminate cement, but in practice a small additional amount may be needed to ensure good flow of the castable composition. This additional water is largely controlled by particle size distribution of the fine fraction of the castable blend, e.g. the calcium aluminate cement, fine alumina and fine silica.

However, in the presence of fine silica, calcium aluminate cement can react at the temperature of use to form phases with a low melting point, thereby leading to a reduction in hot strength. As a consequence, in recent formulations the calcium aluminate cement component has been reduced, the resulting blends being known as low cement castables (LCC) (about 5–10 weight percent calcium aluminate cement) or ultra-low cement castables (ULCC) (about 2 weight percent calcium aluminate cement).

The thermal dehydration (250°–1150° C.) of aluminium hydroxides results in the formation of activated alumina (Alumina Chemicals —Science and Technology Handbook, The American Ceramic Society, 1990, pp 93–108). Activated aluminas are produced from aluminium hydroxides by controlled heating to eliminate most of the water of constitution. Their crystal structure is chi, eta, gamma, and rho alumina in the low temperature range (250°–900° C.) and delta kappa and theta alumina in the high temperature range (900°–1100° C.). The various activated alumina types may be distinguished by X-ray diffraction, IR and $^{27}$Al NMR techniques ("$^{27}$Al Nuclear Magnetic Resonance Spectroscopy Investigation of Thermal Transformation Sequences of Alumina Hydrates", R C T Slade et al, J Mater Chem, 1991, I(4), 563–568).

It is known that activated aluminas can be used to bind refractory formulations. U.S. Pat. No. 3,953,563 filed by Advanced Mineral Research discloses that activated alumina can be used as a binding agent in a refractory brick formulation where there is sufficient moisture in the refractory raw materials to convert the activated alumina to boehmite during the firing operation. The patent states that activated alumina, i.e. transition aluminas, contains different alumina phases, such as gamma alumina, theta alumina, and often some corundum, alpha alumina.

Patents by Nihon Tokoshurozai Kabushiki Kaisha company in Japan (British Patent Specification No. 2,024,195 and U.S. Pat. No. 4,331,773) refer to the use of rho alumina as a binder in a no cement castable (NCC) formulation, the U.S. specification also referring to a formulation containing glass powder. The body of the patent states that the rho alumina contains 60% rho alumina and some chi alumina and others. A paper by Yasuo Hongo entitled "Rho Alumina Bonded Castable Refractories", which describes the experimental work on a commercially available rho alumina, which contains 60% rho alumina and some chi alumina and others, indicates that one of the problems with this formulation is strength development at temperatures below 15° C. It suggests that increasing the curing temperature is the primary measure for improving strength.

In embodiments of the present invention (see below) the activated alumina is predominantly chi alumina as determined by X-ray diffraction and $^{27}$Al NMR.

In use, castable blends ideally provide good castability and green and dried strength, together with high strength of the fired product at low and elevated (working) temperatures. The hydraulic bond formed by activated alumina is somewhat weaker than the bond formed by the calcium aluminate cement at room temperatures, resulting in lower green strength.

Furthermore, as a general rule, in no-cement/activated alumina castable systems (of which the present invention provides a particular type) it is found that progressive addition of fine silica results in an improvement in castability, but a corresponding decrease in green strength. Thus for practical purposes the amount of fine silica actually employed may need to provide a compromise between these two desirable properties, neither being optimised.

It has now been found that by employing particular additives in blends comprising up to 10 weight percent of fine silica it is possible to produce compositions which provide good green strength and castability irrespective of the amount of fine silica. In addition, significantly lower amounts of additive (compared to prior art blends) can be successfully used while still maintaining a satisfactory or good green strength and castability.

At high temperatures, due to the purity of the materials used, the production of liquid phases is minimized, and high-temperature performance of the cast refractory is enhanced.

In a first aspect the present invention provides a composition, suitable for admixture with refractory grains to make a refractory monolithic formulation, comprising, and preferably consisting essentially of:

2 to 10 parts by weight of activated alumina;

0.25 to 1.0 parts by weight of an additive material which comprises at least one of an alumino-silicate-phosphate compound; a resin derived from an aldehyde and either an amine or an aromatic hydroxy compound; cellulose; polyethylene glycol(s); and methoxy polyethylene glycols;

0 to 50 parts by weight of fine alumina;

0 to 10 parts by weight of fine silica;

0 to 1 parts by weight of a dispersant; and 0 to 1 part by weight calcium aluminate cement.

Preferably the composition comprises no more than 0.5 parts by weight percent of calcium aluminate cement, still more preferably no more than 0.2 parts by weight, and most preferably substantially no calcium aluminate cement.

A preferred amount of activated alumina is 3 to 7 parts by weight, more preferably 4 to 6 parts by weight.

As explained above, activated alumina, i.e. transition alumina, contains different types of alumina. A preferred alumina for the present invention comprises at least 50% chi alumina, and this may suitably be prepared from an aluminium hydroxide such as gibbsite. A suitable activated alumina is ACTIBOND 101 from Alcan Chemicals.

ACTIBOND 101 is a white transition alumina powder which is predominantly chi-alumina, but small amounts of other types may be present. It reacts with water to form a hydraulic bond. The chemical composition of ACTIBOND 101 is given in appended Table 1.

A preferred amount of additive is 0.4 to 1.0 parts by weight, more preferably 0.4 to 0.6 parts by weight. The resin may comprise a urea-formaldehyde resin and/or a phenol-formaldehyde resin.

Each of the fine alumina, fine silica and dispersant is optionally present.

The fine silica component may be microsilica and/or fumed silica. This component preferably provides at least 1 part by weight of the composition, and more preferably from 3 to 7 parts by weight.

All or part of the fine alumina could be, for example, a reactive alumina produced under the trade name RA107LS from Alcan Chemicals Europe. Another suitable fine alumina is that produced under the trade name RA7 from Alcan Chemicals Europe. The amount of fine alumina in the composition is preferably no more than 25 parts by weight, and more preferably no more than 15 parts by weight. Preferably the composition comprises not less than 5 parts by weight of this component, and more preferably not less than 8 parts by weight.

The dispersant may be, for example, EMPIPHOS STPP, DARVAN 8IID or CALGON. Preferably EMPIPHOS STPP is employed at 0.05 to 0.2 parts by weight.

In a second aspect the invention provides a refractory monolithic formulation, comprising:

up to 97.75 weight percent inert refractory grains of graded size;

the remainder being a composition according to the first aspect.

In a third aspect the invention provides a refractory monolithic formulation, comprising:

up to 97.75 weight percent inert refractory grains of graded size;

the remainder being a composition consisting essentially of 2 to 10 parts by weight of activated alumina;

0.25 to 1.0 parts by weight of an additive material which provides low temperature binding of the formulation but does not inhibit rehydration of the activated alumina in the presence of water;

0 to 50 parts by weight fine alumina;

0 to 10 parts by weight of fine silica;

0 to 1 parts by weight of a dispersant; and no more than 1 part by weight calcium aluminate cement.

Preferably, the amount of said additive material is sufficient to impart a green strength of the moulded formulation, before drying, of at least 1 MPa, and more preferably at least 2 MPa.

The inert refractory grains may be of fused alumina and/or tabular alumina and/or calcined bauxite and/or aluminosilicates.

The preferred amounts and types of the other components of the formulation according to the third aspect may be as for the first and second aspects of the invention.

The invention extends to a green body formed from a formulation according to the second or third aspects.

In the present invention the activated alumina acts as a binding agent and the use of calcium aluminate cement can be avoided. A higher green strength at and below ambient room temperatures within a short time of curing is provided by the addition to the activated alumina of additive materials as defined in the appended claims ("binding assistants"), and this facilitates further processing and handling at lower temperatures.

The refractory systems to which the invention relates should be distinguished from systems such as that described in European Patent Application Serial No. 0 583 466, which uses 0.5 to 5 weight percent of a phenol resin binder, but only in the context of a system containing a significant amount of powdered metal; and that described in U.S. Pat. No. 3,558,591, where 0.5 weight percent additive is used in the context of a fiber based composition.

BRIEF DESCRIPTION OF THE DRAWINGS AND DETAILED DESCRIPTION OF PREFERRED EMBODIMENTS

Figure 2:
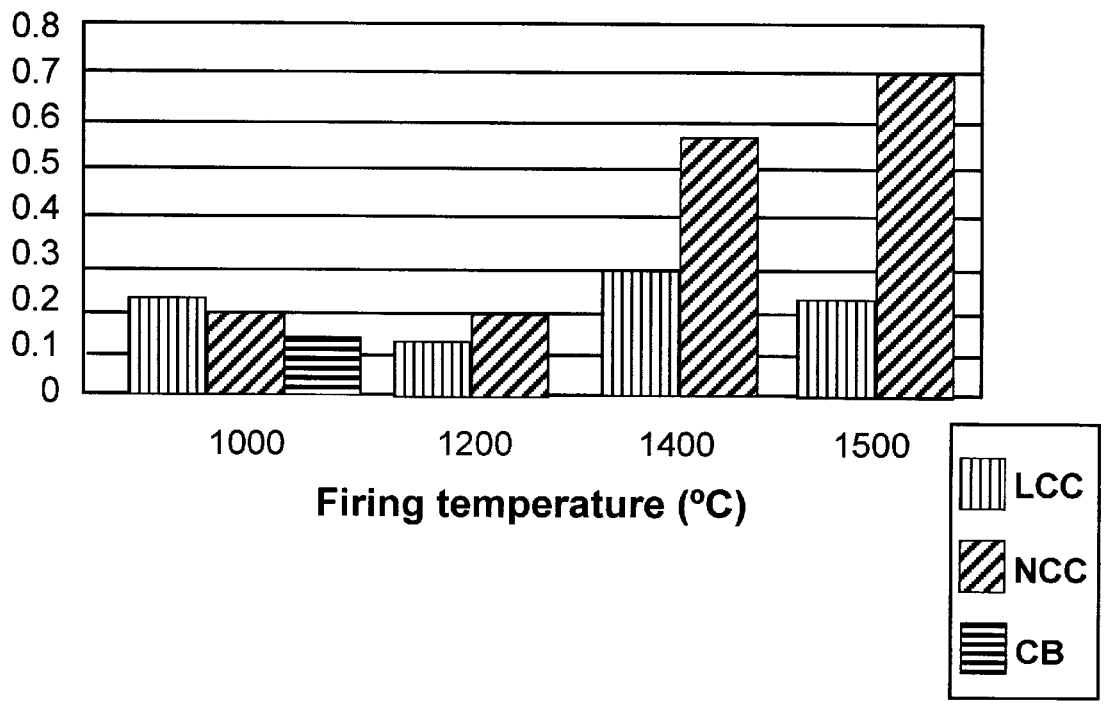

The invention will be further described with reference to a series of experiments, and with reference to FIGS. 1 and 2 in which:

FIG. 1 shows the variation of hot modulus of rupture (HMOR) with firing temperature for products from a low cement castable formulation and a no-cement castable formulation; and FIG. 2 indicates the mullite formation of fired products from a low cement castable formulation and a no-cement castable formulation for different firing temperatures.

For comparative purposes, a no-cement castable (NCC) formulation and a low cement castable (LCC) formulation were made according to the formulations set out in appended Table 2.

Water additions are nominal, the amount being varied to provide acceptable castability. The dispersant is a sodium tripolyphosphate compound.

Appended Table 1 gives the composition of the calcium aluminate cement and the activated alumina in weight percent, and appended Table 3 gives compositions of the formulations of Table 2 in weight percent. It will be seen that the major difference in composition of the formulations is the high calcia content of the LCC.

Test pieces (bricks) were prepared from each formulation by dry mixing for four minutes, adding water and wet mixing for four minutes, then further water was added if necessary so as to reach a good castable consistency. Moulds were filled and vibration was applied to ensure that the mix flowed and air bubbles appeared at the surface. Total time of vibration did not exceed five minutes, and the total time between first addition of water and final smoothing of the mixture in the mould at the end of the vibration period did not exceed ten minutes.

For calcium aluminate cement formulations, the moulds were wrapped in a damp cloth, sealed in plastic, and held at 24° C. to cure for 24 hours. The moulds were removed, and the bricks rewrapped to maintain a high humidity while curing for a further 24 hours at 24° C., following which they were unwrapped and cured at room temperature for 24 hours, and then at 110° to constant weight (about 4 days). The no-cement formulations were cured at 24° C. for 24 hours, and then dried at 110° C. to constant weight (about 4 days). Humidity control is unnecessary for the no-cement formulations.

The two systems exhibited similar, good, casting characteristics. Cold crushing strength, bulk density, porosity and permanent linear change are set out in appended Table 4. Hot modulus of rupture (HMOR) and the amount of mullite present, as determined by x-ray diffraction, are illustrated in FIGS. 1 and 2.

The procedure adopted for measuring the strength of the cured but not dried castable (i.e. its green strength) involved a 3-point bend test. Moulds of 160 mm×40 mm×40 mm were filled with castable while vibration was applied and stored at room temperature for 24 hours. The moulds were then removed and the green strength of the refractory specimen was measured on a Zwick instrument using a 3-point test method with a span of 100 mm and a cross head speed of 1 mm/min.

Cold crushing strength and hot modulus of rupture were measured according to British Standards BS 1902 sections 4.3 and 4.5 respectively.

To determine the amount of mullite present, refractory pieces were analyzed by X-ray diffraction and the ratio of the mullite peak area (121 plane) versus the alumina peak area (113 plane) was determined.

It will be seen that, in general, the NCC formulation has good properties in relation to the LCC formulation. Furthermore, the NCC HMOR data show a considerable degree of improvement, the HMOR of the NCC system at 1500° C. being 4.5 times greater than the LCC system at 1400° C. and more than 3 times greater than the LCC system at 1500° C.

However, while the cold crushing strength of 60.3 MPa of the dried preshaped NCC refractory indicates that a sufficiently good hydraulic bond has been formed to permit handling, nevertheless the green strength is only fair.

It is thought likely that the improved performance of the fired refractory is due to the increased degree of mullite formation illustrated in FIG. 2. Mullite formation can be promoted by the addition of other compounds, for example compounds of lithium or magnesium.

Formulations were prepared by substituting from 0.1 to 1 weight percent of the activated alumina in the NCC formulation given in Table 2 by an equal weight of an additive, either an alumino-silicate-phosphate, such as that known as LITHOPIX AS85, or a urea-formaldehyde resin. The total amount of additive plus activated alumina was maintained at 5 weight percent. In some cases, part or all of the microsilica was replaced by an equal weight of RA107LS reactive alumina supplied by Alcan Chemicals Europe.

Initially, the cast bricks were cured at 24° C. for 24 hours, and green strength judged by feel or look. The use of the additive provided an improvement in green strength, and in general this was good, particularly when the fine silica was replaced by fine reactive alumina. Further experiments (without additive) showed that a formulation with 1% microsilica and 4% RA107LS reactive alumina developed a good green strength. A similar formulation but with 5% microsilica and no RA107LS reactive alumina did not have significant green strength under these conditions.

The properties of these formulations according to the invention are set out in appended Table 5, which includes data for LCC and NCC control formulations for comparative purposes. In some examples, the microsilica has been totally or partially replaced by RA107LS reactive alumina (i.e in addition to the 10 weight percent milled alumina already present). The green strength GS was measured after 24 hours at 24° C. The cold crushing strength (CCS) in MPa was determined after drying at 110° C., and the hot modulus of rupture is given in MPa ($MN/m^2$).

As will be seen, formulations which comprise 0.25 to 1.0 weight percent of the additive according to the invention and the NCC control show comparable HMOR figures which are good relative to the LCC control, particularly at higher temperatures.

It will also be seen that the NCC control of Table 5, containing 5 weight percent silica, provides a green strength which is only fair to good.

By contrast, the green strength obtained from formulations according to the present invention, also containing up to 5 weight percent of fine silica, is comparable to that provided by the LCC control.

Thus formulations according to the invention provide good castability and green strength, while permitting the production of fired products with a high HMOR. There is an improvement both over known NCC castables, where the amount of silica tends to represent a compromise between castability and green strength, and over known LCC castables where the use of calcium aluminate cement tends to reduce the HMOR. A relatively high green strength can be obtained even at temperatures as low as 10° C. (for example), as illustrated in example 16 (Table 14), described hereafter.

Other additives were tested, but with negative results. Starch products, sulphonated polystyrene, and sulphonated polystyrene products all provide a fairly rapid set, but with little or no green strength when removed from the mould after 24 hours.

The invention is further illustrated by the following examples. It will be understood that examples 1, 3, 5, 8, 10, 12 and 15 contain no additive, and so do not fall within the scope of the invention.

EXAMPLE 1

In this example, a typical calcined bauxite formulation for making no-cement castables (NCC) was used. This was a standard refractory castable preparation conforming to BS1902: section 7.3 (1982). A Hobart mixer was employed.

To 80 parts by weight of calcined bauxite aggregates, as in Table 2, was added 10 parts by weight milled (fine) alumina RA7, 5 parts by weight reactive alumina RA107LS, 5 parts by weight activated alumina, ACTIBOND 101, and 0.1 parts by weight of a dispersant EMPIPHOS STPP. After dry mixing at low speed for a maximum of 4 minutes, a predetermined amount (6.6 weight percent) of water was added, mixing continuing at a higher speed for another 4 minutes. A 229 mm×102 mm×102 mm steel mould was clamped to a vibrating table, filled with the mix, and vibrated at about 50 Hz for 4 minutes, during which more mix was added and levelled to the top of the mould.

After curing at room temperature (24° C.) for 24 hours, the mould was removed and the sample air dried overnight at room temperature.

Such samples were dried in an oven at 110° C. to constant weight (about 3 days), and were also fired in a furnace to the temperatures indicated in Table 4 for 5 hours. Samples were tested for cold crushing strength (CCS) and hot modulus of rupture according to BS1902 section 4.3 and 4.5 respectively.

Samples of 160 mm×40 mm×40 mm were prepared similarly for measurement of green strength, which was performed on samples after curing at room temperature for 24 hours. The 3-point bend test was employed for this measurement, using a Zwick instrument, with a span of 100 mm and cross-head speed of 1 mm/min. The results are illustrated in appended Table 7.

EXAMPLES 2 TO 6

These were formed along the lines set out in Example 1, with compositions as in appended Table 6, and results as in appended Table 7.

EXAMPLES 7 TO 12

These were formed along the lines set out in Example 1, with compositions as in appended Tables 8 and 10, and results as in appended Table 9.

EXAMPLES 13 TO 15

These were formed along the lines set out in Example 1, with compositions as in appended Table 11 and 13, and results as in appended Table 12.

EXAMPLE 16

(Comparison with Example 6)

Using the formulation for Example 6, the general procedure outlined in Example 1 was followed, but modified in that the sample was cured in the mould at 10° C. for 24 hours, and then air dried at 10° C. for another 24 hours prior to measuring green strength. It will be seen From Table 14 that green strength of sample 16 is still relatively high, and that the HMOR figures for the two samples are generally comparable.

TABLE 1

Composition of cement/activated alumina

|  | Calcium Aluminate Cement wt % | Activated Alumina ACTIBOND 101 wt % |
|---|---|---|
| $Al_2O_3$ | 70.5 | 93.5 |
| $SiO_2$ | <0.8 | 0.02 |
| CaO | 28.0 | 0.03 |
| $Fe_2O_3$ | <0.3 | 0.02 |
| $Na_2O$ | <0.3 | 0.4 |
| MgO | <0.3 | 0.007 |
| Loss on ignition | 0 | 6 |

TABLE 2

|  | LCC (% w/w) | NCC (% w/w) |
|---|---|---|
| Calcined Bauxite |  |  |
| 3.35–1.29 mm | 31.6 | 31.6 |
| 1.29–0.5 mm | 18.9 | 18.9 |
| 0.5–0.29 mm | 9.1 | 9.1 |
| 0.29–0.17 mm | 7.2 | 7.2 |
| 0.17–0 mm | 13.2 | 13.2 |
| Fine alumina | 10.0 | 10.0 |
| Fine Silica* | 5.0 | 5.0 |
| Calcium aluminate cement** | 5.0 | — |
| Activated alumina | — | 5.0 |
| Water and dispersant addition, as % w/w of the above formulation. |  |  |
| Dispersant*** | 0.1 | 0.1 |
| Water | 4.5 | 5.2 |

*ELKEM- Microsilica 971U
**Lafarge Aluminates - SECAR 71
***Lafarge Aluminates - EMPIPHOS STPP

TABLE 3

Composition of Blend

|  | LCC | NCC |
|---|---|---|
| $Al_2O_3$ | 81.5 | 82.7 |
| $SiO_2$ | 13.0 | 13.0 |
| CaO | 1.4 | 0 |
| $Fe_2O_3$ | 1.4 | 1.4 |
| $Na_2O$ | 0.2 | 0.02 |

TABLE 4

|  | LCC | NCC |
|---|---|---|
| Cold crushing strength MPa |  |  |
| as dried (110° C.) | 159 | 60.3 |
| after firing (1200° C.) | 154.7 | 129.4 |
| after firing (1500° C.) | 129.4 | 141.6 |
| Bulk density (g/cc) |  |  |
| as dried (110° C.) | 2.96 | 2.94 |
| after firing (1290° C.) | 2.92 | 2.95 |
| after firing (1500° C.) | 2.86 | 3.00 |
| Porosity (%) |  |  |
| as dried (110° C.) | 9.18 | 15.23 |
| after firing (1200° C.) | 13.9 | 18.0 |
| after firing (1500° C.) | 19.2 | 17.96 |
| Permanent linear change (%) |  |  |
| as dried (110° C.) | −0.19 | −0.19 |
| after firing (1200° C.) | −0.31 | −0.36 |
| after firing (1500° C.) | +0.34 | −0.44 |

TABLE 5

| Blend | Fine Silica Wt % | Reactive Alumina Wt % | Additive Wt % | Water Wt % | GS | CCS | Hot MOR 1200° C. | Hot MOR 1500° C. |
|---|---|---|---|---|---|---|---|---|
| Control 1 | 5 | 0 | Secar 71 | 4.7 | vg | 148 | 29.3 | 1.1 |
| Control 2 | 5 | 0 | — | 5.2 | f/g | 50.4 | 26.4 | 4.7 |
| 1 | 5 | 0 | AS85, 0.5% | 5.6 | vg | 49.6 | — | — |

TABLE 5-continued

| Blend | Fine Silica Wt % | Reactive Alumina Wt % | Additive Wt % | Water Wt % | GS | CCS | Hot MOR 1200° C. | Hot MOR 1500° C. |
|---|---|---|---|---|---|---|---|---|
| 2 | 5 | 0 | AS85, 0.75% | 5.4 | vg | 34.0 | 26.4 | 4.7 |
| 3 | 5 | 0 | AS85, 0.1% | 5.6 | g | — | — | — |
| 4 | 0 | 5 | AS85, 0.5% | 6 | vg | 47.0 | — | — |
| 5 | 2 | 3 | AS85, 0.1% | 5.6 | vg | 71.9 | — | — |
| 6 | 5 | 0 | UFR, 0.5% | 4.7 | vg | 55.0 | 28.7 | 4.5 |
| 7 | 5 | 0 | UFR, 0.75% | 5 | vg | 50.5 | — | — |
| 8 | 5 | 0 | UFR, 0.1% | 5.2 | f/g | 51.2 | — | — |
| 9 | 5 | 0 | UFR, 0.25% | 5.1 | g | 59.7 | — | — |
| 10 | 3 | 2 | UFR, 0.5% | 5.2 | vg | 54.5 | — | — |

UFR = urea-formaldehyde resin; AS85 = LITHOPIX AS85; vg = very good; g = good; f = fair

TABLE 6

| Example | 1 | 2 | 3 | 4 | 5 | 6 |
|---|---|---|---|---|---|---|
| Calcined bauxite aggregates | 80 | 80 | 80 | 80 | 80 | 80 |
| Milled alumina | 10 | 10 | 10 | 10 | 10 | 10 |
| Reactive alumina | 5 | 5 | 4 | | | |
| Microsilica | | | 1 | 1 | 5 | 5 |
| ACTIBOND 101 | 5 | 4.5 | 5 | 4.5 | 5 | 4.5 |
| UFR | | 0.5 | | 0.5 | | 0.5 |
| Other Components | | | | | | |
| Dispersant | 0.1 | 0.1 | 0.1 | 0.1 | 0.1 | 0.1 |
| Water | 6.6 | 5.9 | 5.8 | 5.7 | 5.2 | 4.2 |

UFR — urea-formaldehyde resin

TABLE 7

| Example | 1 | 2 | 3 | 4 | 5 | 6 |
|---|---|---|---|---|---|---|
| Water % | 6.6 | 5.9 | 5.8 | 5.7 | 5.2 | 4.2 |
| MS % | 0 | 0 | 1 | 1 | 5 | 5 |
| Green Strength, MPa | 1.95 | 1.67 | 1.75 | 1.95 | 1.55 | 2.92 |
| CCS, MPa, 110° C. | 60.6 | 33.1 | 84.7 | 36 | 50.4 | 55 |
| CCS, MPa, 1200° C. | 20 | 15.5 | 85.7 | 75.2 | 135 | 129 |
| CCS, MPa, 1500° C. | 87 | 96.5 | 106.4 | 95 | 105 | 125 |
| HMOR, MPa, 1200° C. | 21.4 | 2 | 8.29 | 7.32 | 28.7 | 28.7 |
| HMOR, MPa, 1500° C. | 3.9 | 3.99 | 4 | 3.47 | 4.5 | 4.5 |

MS — microsilica; CCS — cold crushing strength; HMOR — hot modulus of rupture

TABLE 8

| Example | 7 | 8 | 9 | 10 | 11 | 12 |
|---|---|---|---|---|---|---|
| Fused White | 81 | 81 | 81 | 81 | 81 | 81 |
| Milled alumina | 9 | 9 | 8 | 8 | 9 | 9 |
| Microsilica | 5 | 5 | 3 | 3 | 4 | 4 |
| Raw kyanite | — | — | 3 | 3 | 1 | 1 |
| ACTIBOND 101 | 4.5 | 5 | 4.5 | 5 | 4.5 | 5.0 |
| UFR | 0.5 | — | 0.5 | — | 0.5 | — |
| Other Components | | | | | | |
| Dispersant | 0.1 | 0.1 | 0.1 | 0.1 | 0.1 | 0.1 |
| Water | 3.8 | 3.8 | 4.1 | 4.4 | 3.8 | 4.0 |

UFR — urea-formaldehyde resin

TABLE 9

| Example | 7 | 8 | 9 | 10 | 11 | 12 |
|---|---|---|---|---|---|---|
| Raw Kyanite, % | 0 | 0 | 3 | 3 | 1 | 1 |
| Water % | 3.8 | 3.8 | 4.1 | 4.4 | 3.8 | 4 |
| MS % | 5 | 5 | 3 | 3 | 4 | 4 |
| Binder % (UFR + AA) | 5 | 5 | 5 | 5 | 5 | 5 |
| Green Strength MPa | vg | g | vg | g | vg | g |
| HMOR, MPa, 1200° C. | 15.5 | 16.3 | 13.7 | 9.4 | 14.5 | 15.8 |
| HMOR, MPa, 1500° C. | 3.4 | 3.7 | 5.9 | 3.5 | 4.9 | 3.6 |

MS — microsilica; HMOR — hot modulus of rupture
AA — activated alumina; UFR — urea-formaldehyde resin

TABLE 10

| Material | Grade | % |
|---|---|---|
| Fused White Mesh Sizes | 5–3 mm | 81 |
| | 3–1 mm | |
| | 1–0 mm | |
| | −200# | |
| Milled Alumina | C9OLSB | 8–10 |
| Alumina Binder | (AA + UFR) | 5 |
| Microsilica | ELKEM 971U | 3–5 |
| Raw Kyanite | −325# | 0–3 |
| Other Components | | |
| Dispersant | EMPIPHOS STPP | 0.1 |
| Water | Deionized | 3.8–4.9 |

AA - activated alumina; UFR - urea-formaldehyde resin

TABLE 11

| Example | 13 | 14 | 15 |
|---|---|---|---|
| Tabular Alumina | 80 | 80 | 80 |
| Milled Alumina | 9 | 12 | 9 |
| Microsilica | 3 | | 3 |
| Raw kyanite | 3 | 3 | 3 |
| Actibond 101 | 4.5 | 4.5 | 5 |
| UFR | 0.5 | 0.5 | — |
| Other Components | | | |
| Dispersant | 0.2 | 0.2 | 0.2 |
| Water | 4.6 | 4.4 | 4.9 |

UFR - urea-formaldehyde resin

TABLE 12

| Example | 13 | 14 | 15 |
|---|---|---|---|
| Kyanite, % | 3 | 3 | 3 |
| Water % | 4.6 | 4.4 | 4.9 |
| MS % | 3 | 0 | 3 |
| Binder % (UFR + AA) | 5 | 5 | 5 |
| Green Strength, MPa | vg | 2.6 MPa | g |
| HMOR, MPa, 1200° C. | 7.4 | 6.6 | 7.5 |
| HMOR, MPa, 1500° C. | 5.0 | 2.2 | 3.7 |

MS - microsilica; HMCR - hot modulus of rupture
AA - activated alumina; UFR - urea-formaldehyde resin

TABLE 13

| Material | Grade | % |
|---|---|---|
| Tabular Alumina Mesh Sizes | 3–6 mm | 80 |
|  | 6–10 mm |  |
|  | 8–14 mm |  |
|  | 14–28 mm |  |
|  | 28–200 mm |  |
|  | 200 mm–20# |  |
| Milled Alumina | C90LSB | 9 |
| Alumina Binder | (AA + UFR) | 5 |
| Microsilica | ELKEM 971U | 3 |
| Raw Kyanite | –325# | 3 |
| Other Components |  |  |
| Dispersant | EMPIPHOS STPP | 0.2 |
| Water | Deionized | 4.6 |

AA - activated alumina; UFR - urea-formaldehyde resin

TABLE 14

|  | Example 6<br>24° C. Curing | Example 16<br>10° C. Curing |
|---|---|---|
| MS, % | 5 | 5 |
| Green Strength, MPa | 2.92 | 2.10 |
| HMOR, 1200° C., MPa | 28.7 | 18.8 |
| HMOR, 1500° C., MPa | 4.5 | 4.9 |

We claim:

1. A composition suitable for admixture with refractory grains to make a refractory monolithic formulation, consisting essentially of:
   2 to 10 parts by weight of activated alumina;
   0.25 to 1.0 parts by weight of an additive material which is selected from the group consisting of an alumino-silicate-phosphate compound; a resin derived from an aldehyde and either an amine or an aromatic hydroxy compound; cellulose; polyethylene glycol(s); methoxy polyethylene glycols and mixtures thereof;
   0 to 50 parts by weight of fine alumina;
   0 to 10 parts by weight of fine silica;
   0 to 1 parts by weight of a dispersant; and
   0 to 1 part by weight calcium aluminate cement.

2. A composition according to claim 1 comprising substantially no calcium aluminate cement.

3. A composition according to claim 1 wherein said resin comprises a urea-formaldehyde resin and/or a phenol-formaldehyde resin.

4. A composition according to claim 1 comprising 0.4 to 0.6 parts by weight of said additive.

5. A composition according to claim 1 comprising at least 1 part by weight fine silica.

6. A composition according to claim 1 wherein the fine silica comprises microsilica and/or fumed silica.

7. A composition according to claim 1 comprising 5 to 25 parts by weight fine alumina.

8. A composition according to claim 1 wherein part or all of the fine alumina is reactive alumina.

9. A refractory monolithic formulation, consisting essentially of:
   up to 97.75 weight percent inert refractory grains of graded size; and
   the remainder being a composition according to claim 1.

10. A refractory monolithic formulation, consisting essentially of:
    up to 97.75 weight percent inert refractory grains of graded size; and
    the remainder being a composition consisting essentially of
    2 to 10 parts by weight of activated alumina;
    0.25 to 1.0 parts by weight of an additive material which provides low temperature binding of the formulation but does not inhibit rehydration of the activated alumina in the presence of water;
    0 to 50 parts by weight fine alumina;
    0 to 10 parts by weight of fine silica;
    0 to 1 parts by weight of a dispersant; and
    no more than 1 part by weight calcium aluminate cement.

11. A formulation according to claim 10, which can be molded, wherein the amount of said additive material is sufficient to impart a green strength to the moulded formulation, before drying, of at least 1 MPa.

12. A formulation according to claim 11 wherein said green strength before drying is at least 2 MPa.

13. A formulation according to claim 9 wherein the inert refractory grains are selected from the group consisting of fused alumina, tabular alumina, calcined bauxite, aluminosilicates and mixtures thereof.

14. A green body formed from a formulation according to claim 9.

15. A formulation according to claim 10 wherein the inert refractory grains are selected from the group consisting of fused alumina, tabular alumina, calcined bauxite, aluminosilicates and mixtures thereof.

16. A green body formed from a formulation according to claim 10.

17. A green body formed from a formulation according to claim 11.

18. A green body formed from a formulation according to claim 12.

19. A green body formed from a formulation according to claim 13.

20. A green body formed from a formulation according to claim 15.

* * * * *